United States Patent
Merino-Lopez

(10) Patent No.: US 8,863,799 B2
(45) Date of Patent: *Oct. 21, 2014

(54) TIRE WITH A CELLULAR LAYER

(75) Inventor: Jose Merino-Lopez, Riom (FR)

(73) Assignee: Michelin Recherche et Technique, Granges-Paccot (CH)

( * ) Notice: Subject to any disclaimer, the term of this patent is extended or adjusted under 35 U.S.C. 154(b) by 1410 days.

This patent is subject to a terminal disclaimer.

(21) Appl. No.: 12/108,185

(22) Filed: Apr. 23, 2008

(65) Prior Publication Data

US 2008/0264538 A1    Oct. 30, 2008

(30) Foreign Application Priority Data

Apr. 26, 2007 (FR) ...................................... 07 03117

(51) Int. Cl.
*B60C 5/00* (2006.01)
*B60C 5/20* (2006.01)
*B60C 19/00* (2006.01)

(52) U.S. Cl.
USPC ..................... 152/331.1; 152/339.1; 152/450; 152/510

(58) Field of Classification Search
USPC ....................................................... 152/340.1
See application file for complete search history.

(56) References Cited

U.S. PATENT DOCUMENTS

| | | | | |
|---|---|---|---|---|
| 616,516 A * | 12/1898 | Wilson | ........................ | 152/339.1 |
| 3,129,743 A * | 4/1964 | Nonnamaker | ............. | 152/341.1 |
| 3,607,601 A * | 9/1971 | Milam et al. | ............... | 428/316.6 |
| 4,161,202 A | 7/1979 | Powell et al. | .................. | 152/347 |
| 4,252,378 A | 2/1981 | Debolt et al. | .................... | 301/63 |
| 4,392,522 A | 7/1983 | Bschorr | ........................ | 152/341 |
| 4,399,851 A | 8/1983 | Bschorr | ........................ | 152/156 |
| 5,795,414 A * | 8/1998 | Shih | .............. | 152/195 |
| 6,343,843 B1 | 2/2002 | Nishikawa | .................... | 301/6.91 |
| 6,716,380 B2 | 4/2004 | Durif et al. | ....................... | 264/51 |
| 7,694,707 B2 * | 4/2010 | Agostini et al. | ............... | 152/510 |
| 2001/0004924 A1 | 6/2001 | Aoki et al. | ................. | 156/394.1 |
| 2002/0144760 A1 | 10/2002 | Devizzi et al. | ............. | 152/209.2 |

FOREIGN PATENT DOCUMENTS

| | | | |
|---|---|---|---|
| DE | 40 01 753 A1 | | 7/1991 |
| DE | 102 20 193 A1 | | 11/2003 |
| EP | 937586 | * | 8/1999 |
| EP | 1 155 801 A1 | | 11/2001 |
| EP | 0 912 354 B1 | | 12/2001 |
| EP | 1 214 205 B1 | | 3/2004 |
| EP | 1 510 366 A1 | | 3/2005 |
| FR | 2 233 194 | | 1/1975 |
| FR | 2755400 | * | 5/1998 |
| JP | 2002-67632 | * | 3/2002 |
| WO | WO 97/49566 | * | 12/1997 |

* cited by examiner

*Primary Examiner* — Justin Fischer

(74) *Attorney, Agent, or Firm* — Fitzpatrick, Cella, Harper & Scinto

(57) ABSTRACT

A tire with a cellular layer is provided. The tire includes a tire structure formed of at least one crown extended by two sidewalls and two beads. A base of each of the two beads is configured to be mounted onto a rim seat. The tire also includes a carcass-type reinforcing structure anchored into the two beads, and a layer that includes a cellular material, also referred to as a cellular layer. The cellular layer is positioned on an inner wall of the tire structure, such that the cellular layer is bonded to the tire structure over at most over 20% of a surface of the cellular layer and is not bonded to the tire structure elsewhere on the surface.

15 Claims, 4 Drawing Sheets

TIRE WITH A CELLULAR LAYER

FIELD OF THE INVENTION

The invention relates to a tire whose rolling noise within a vehicle is reduced so as to give improved comfort.

BACKGROUND

Many different noises pollute the environment of a vehicle. Some are due to the tires. In this type of noise, one part of the noise spectrum that is of particular nuisance is the cavity mode. The cavity mode is the resonance of the column of air inside the tire.

The frequency range of the interior noise in a vehicle, which results from a tire when travelling, typically is 80 to 500 Hz. The frequency of the cavity mode is a function of the size of the tire. At very low speed, a peak in the first cavity mode (FCM) is around 230 Hz.

When travelling, two peaks appear. At 80 km/h, the frequencies of these peaks are approximately 210 and 250 Hz. FIG. 1 clearly shows these frequencies (arrow A). From a subjective point of view of comfort, the peaks in the FCM are a nuisance as they are very audible.

It is known that placing mobile components inside a tire may have a positive effect on reducing the interior noise, in particular a damping of the first cavity mode. European patent document EP 1 214 205 B1 clearly illustrates this principle. For example, particles of open-cell materials may be placed in the tire cavity.

U.S. Pat. No. 6,343,843 discloses a pneumatic tire, which is provided with lawn-like materials for damping air resonance of the tire cavity.

Alternatively, filling the cavity with a foam or another material, such as sand, is presented in US Patent Application Publication No. 2001/0004924.

U.S. Pat. No. 4,252,378 describes an arrangement in which the rim of a tire is filled with a foam.

European patent document EP 1 510 366 A1 describes an arrangement in which a noise-damping body is placed under a crown zone of a tire.

French patent document FR 2 233 194 describes a tire that includes, on its inner wall, a layer of closed-cell cellular rubber whose cells are filled with a pressurized gas.

German patent document DE 102 20 193 presents a tire that includes an absorbent wall placed in an inner cavity of the tire, bonded to two beads of the tire but not bonded elsewhere to an inner wall of the tire. This absorbent wall includes microperforations for damping an air resonance of the tire cavity.

The preceding systems are complex and expensive.

SUMMARY OF THE INVENTION

To overcome these drawbacks, an aspect of the invention provides a tire that includes a tire structure formed of at least one crown extended by two sidewalls and two beads. A base of each of the two beads is adapted for mounting onto a rim seat. The tire also includes a carcass-type reinforcing structure anchored into the two beads, and a layer that includes a cellular material positioned on an inner wall of the tire structure, referred to as a cellular layer. The cellular layer is bonded to the tire structure over at most 20% of the surface of the cellular layer and the rest of the cellular layer is not bonded. A curved length of the cellular layer in any axial cross section ($L_{ca}$) is greater than a curved length of the inner wall of the tire structure in contact with the cellular layer in the same axial cross section ($L_{pa}$).

The fact that the cellular layer is not bonded to the tire structure over the whole of the surface of the cellular layer substantially improves the noise reduction obtained. The noise improvement (i.e., reduction) is very significant. The impact is greater than 4 dBA in the zones of the noise spectrum corresponding to the peaks in the first cavity mode (FCM) and to the frequencies between 300 and 350 Hz, relative to a tire without a "free" cellular layer.

The effect on reducing the noise is reinforced because the cellular layer is large compared to the tire, which means that, even after inflating the tire, the surface of the cellular layer is not taut but is folded. These folds cause the geometry of the cavity to be less "even" and thus the folds are positive factors in noise absorption.

Advantageously, the cellular layer is bonded to the tire structure by its two edges.

And, particularly advantageously, the cellular layer is bonded to the tire structure at the two beads.

Advantageously:

$$1.1 < \frac{L_{ca}}{L_{pa}} < 2.5.$$

The cellular layer has an overlength in any axial cross section that reinforces the rolling noise attenuation. This effect becomes perceptible with a 10% increase in the length relative to a length of the same axial cross section of the tire, and beyond a factor of 2.5 it is observed that the cellular layer becomes too heavy.

Similarly, a curved length of the cellular layer in any longitudinal cross section ($L_{cl}$) is advantageously greater than a curved length of the inner wall of the tire structure in contact with the cellular layer in the same longitudinal cross section ($L_{pl}$).

Advantageously:

$$1.1 < \frac{L_{cl}}{L_{pl}} < 2.5.$$

According to an embodiment, the cellular layer is formed of a material that includes butyl rubber.

This makes it possible to easily attach the cellular layer to the tire structure by means of an additional layer of butyl rubber.

Cellular materials that include butyl rubber are well known in the prior art. By way of example, European patent documents EP 1 155 801 B1 and EP 0 912 354 B1 may be consulted.

Preferably, the cellular layer is a predominantly closed-cell layer.

According to another embodiment, the cellular layer includes a first non-cellular layer and a second layer made of a predominantly closed-cell cellular material positioned on an innermost side of a cavity of the tire structure.

This embodiment has the advantage of reinforcing the gas tightness (i.e., gas impermeability) of the tire.

According to another embodiment, the cellular layer includes a first layer made of a predominantly closed-cell cellular material and a second layer made of an open-cell cellular material. This second layer may be formed of a material that includes a polyurethane foam, which is placed in the tire after vulcanization, for example.

A tire according to an aspect of the invention may advantageously additionally include an airtight layer made of a non-cellular material, continuously attached to the tire structure and positioned between the cellular layer and the tire structure. This embodiment gives an excellent gas tightness or impermeability of the tire.

The thickness of the cellular layer may be between 0.5 and 10 mm and preferably is between 1 and 4 mm.

The density of the cellular layer may be between 0.04 and 0.8 g/cm$^3$ and preferably is between 0.06 and 0.3 g/cm$^3$.

Another aspect of the invention is a process for manufacturing a tire. The process includes:
  placing on a manufacturing drum a layer of material that includes a foaming agent, the layer being referred to as a cellular layer;
  applying to edges of the cellular layer a strip of bonding material;
  applying a layer of material constituting an inner wall of a tire structure, wherein the material that includes the foaming agent is chemically incompatible with the material constituting the inner wall;
  completing preparation of the tire structure; and
  vulcanizing the tire structure.

This process is particularly suitable in the case where the cellular layer and the material constituting the inner wall of the tire structure in contact with it are chemically incompatible. It then suffices to allow the foaming agent of the cellular layer to undergo expansion with demoulding of the tire, so that internal stresses produced by the expansion break the bonds created during the vulcanization, between the cellular layer and the inner wall of the tire structure facing it. The cellular layer is therefore then completely debonded from the tire apart from bonding zones, preferably located at two beads of the tire structure. In an embodiment, the cellular layer includes butyl rubber and an airtight rubber of the tire structure does not include butyl rubber or is absent altogether. The bonding agent in the bonding zones advantageously includes a strip of material that includes butyl rubber without a foaming agent.

When there is chemical compatibility between the cellular layer and the material constituting the inner wall of the tire structure facing it, an anti-tack agent such as talc or chalk is advantageously used to ensure separation of the cellular layer from the inner wall of the tire structure after vulcanization of the tire structure.

BRIEF DESCRIPTION OF THE DRAWINGS

Details of embodiments of the invention are given in the following description, supplemented by the appended drawings of FIGS. 1 to 8, in which.

DETAILED DESCRIPTION OF EMBODIMENTS OF THE INVENTION

In what follows, the expression "axial cross section" of a tire is understood to mean any cross section that passes through the axis of rotation of the tire; and the expressions "transverse cross section" and "longitudinal cross section" are understood to mean any cross section perpendicular to the axis of rotation of the tire.

Figure 1:
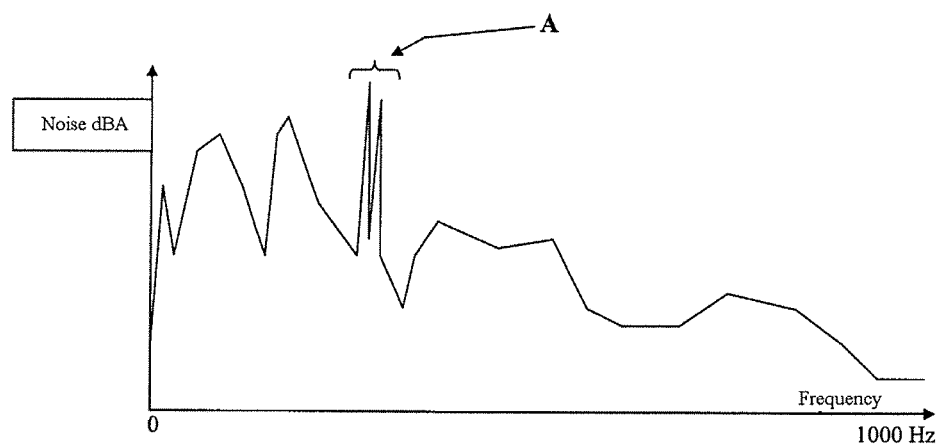
FIG. 1 illustrates a typical noise spectrum of a vehicle travelling at 80 km/h.

FIG. 1 presents a typical spectrum of noise amplitude as a function of frequency measured in a passenger vehicle travelling at 80 km/h. Two peaks, linked to a first cavity mode around 230 Hz (arrow A), are particularly noted. These two peaks are very audible and are a great nuisance from the point of view of comfort for the driver or a passenger of the vehicle.

Figure 2:
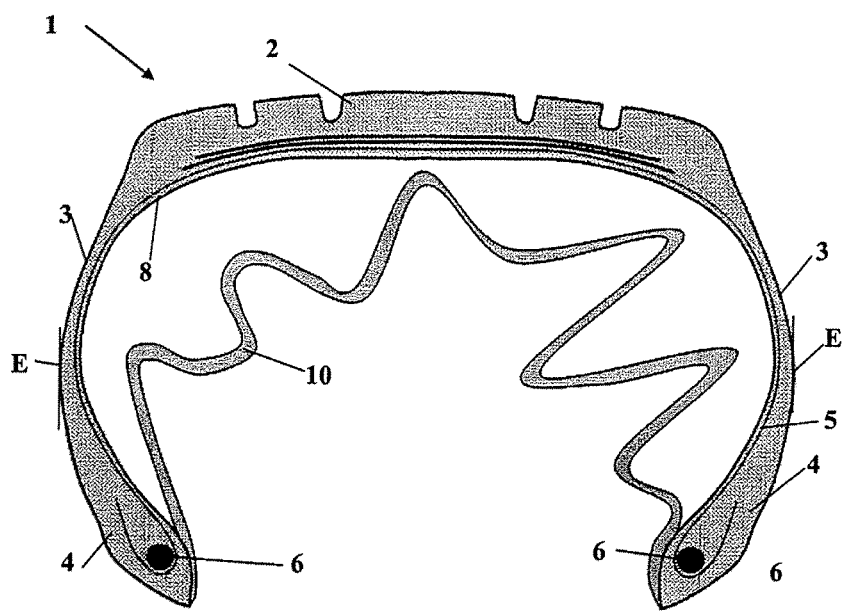
FIG. 2 illustrates an example of a tire that includes a cellular layer according to an embodiment of the invention.

FIG. 2 presents a tire 1 according to an embodiment of the invention seen in axial cross section. The tire includes a tire structure formed of at least a crown 2 and two sidewalls 3 extended by two beads 4. A carcass-type reinforcing structure 5 is anchored into the two beads 4 around bead wires 6. The tire also includes a cellular layer 10 bonded to an inner wall 8 of the tire structure at the two beads 4 but unbonded elsewhere, that is, the cellular layer 10 is not bonded at the sidewalls 3 or the crown 2. A bonding surface of the cellular layer 10 represents a small fraction of its total surface, less than 20%. The sites for bonding of the cellular layer 10 may be positioned on the inner wall 8 of the tire structure at any zone of the beads 4 or of the sidewalls 3 up to the equator E of the tire 1. One preferred zone is at the beads 4, as illustrated in FIG. 2. The cellular layer 10 is formed of a cellular material with internal cells that are predominantly closed and filled with a pressurized gas. Such cellular materials are well known to a person skilled in the art.

The cellular layer 10 is very predominantly not bonded to the inner wall 8 of the tire structure, which allows it to have a damping action on the peaks in the first cavity mode.

Figure 3:
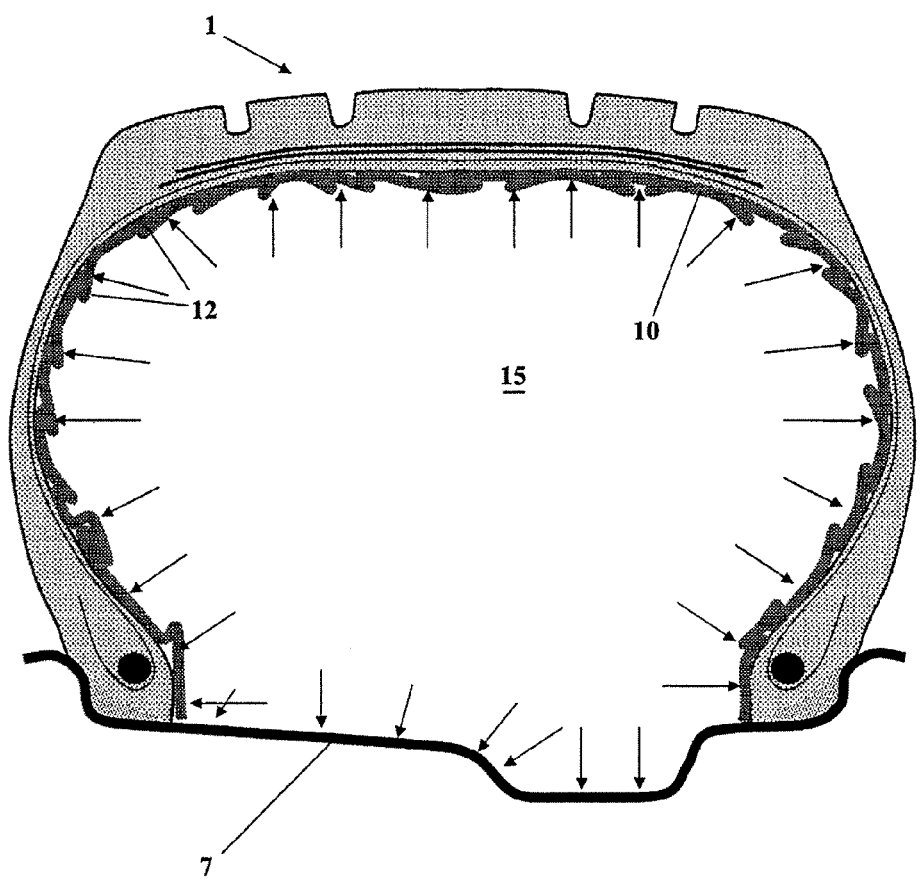
FIG. 3 illustrates the tire of FIG. 2, mounted on its service rim and inflated.

Another feature of the cellular layer 10 of the present embodiment is that it has a curved length in any axial and longitudinal cross section of the tire 1, and this curved length is advantageously greater than a curved length in the same axial or respectively longitudinal cross section of the inner wall 8 of the tire structure. The result of this is that when the tire 1 according to this embodiment of the invention is mounted on its service rim 7 and inflated to its operating pressure, the cellular layer 10 is flattened against the inner wall 8 of the tire structure by making folds 12, such as illustrated in FIG. 3. The presence of these folds gives the wall of the pressurized tire cavity 15 an uneven surface, which promotes the damping of rolling noise. In FIG. 3, the arrows illustrate the action of the inflation pressure on the cellular layer 10 and the wall of the tire 1.

Figure 4:
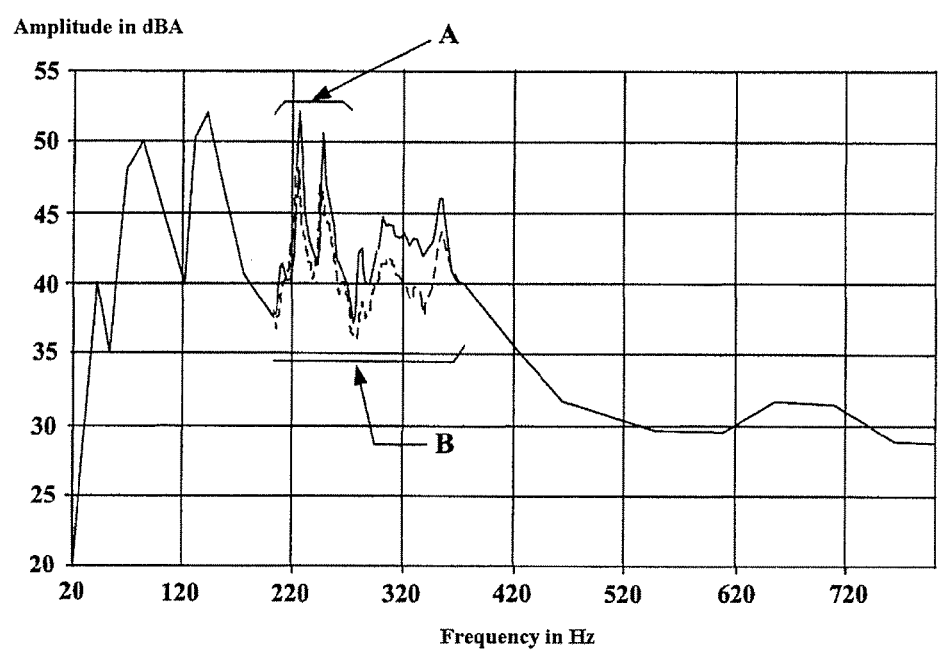
FIG. 4 illustrates an improvement in the noise spectrum obtained with a tire according to an embodiment of the invention.

FIG. 4 presents noise measurement results taken in a vehicle travelling at 80 km/h on a macro-rough ground in two configurations:
  solid line: the vehicle is equipped with standard tires inflated to 2.3 bar; and
  dotted line: the same vehicle is equipped with tires according to an embodiment of the invention, each including a cellular layer predominantly unbonded from the inner wall 8 of the tire structure.

In particular, an improvement of 5 dBA is noted for the two peaks in the first cavity mode (arrow A). More generally, an improvement of 3 to 5 dBA is noted in the frequency range of 180-350 Hz, a frequency range that is particularly sensitive for comfort (arrow B).

Figure 5:
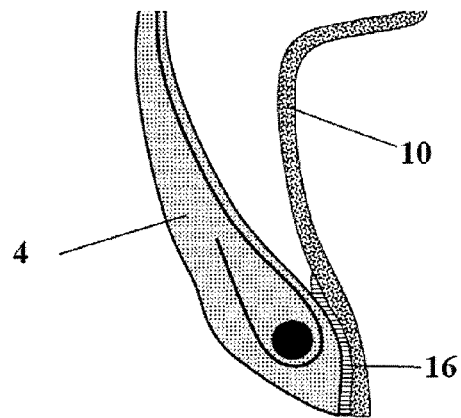
FIG. 5 illustrates a process for bonding a cellular layer to a bead.

FIG. 5 illustrates the attachment of the cellular layer 10 to the inner wall 8 of the bead 4. This attachment is provided by the presence of a layer 16 of bonding material.

In a preferred case where the cellular layer 10 includes butyl rubber, the layer 16 may simply be a layer of butyl material that does not include a foaming agent.

Figure 6:
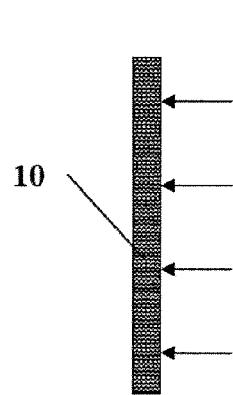
FIGS. 6, 7, and 8 give three examples of arrangements of a cellular layer.

FIG. 6 presents one particularly simple embodiment of the cellular layer 10. This cellular layer 10 is composed of a predominantly closed-cell cellular material. One example of such a material is described in European patent document EP 1 214 205 B1 by the Applicants.

Figure 7:
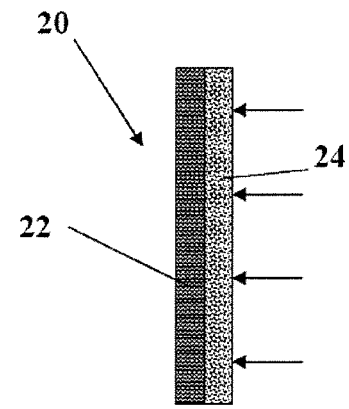

FIG. 7 presents a cellular layer 20 according to another embodiment of the invention. This cellular layer 20 is composed of a first predominantly closed-cell cellular layer 22, preferably produced with a butyl rubber that includes a foaming agent, and a second predominantly open-cell cellular layer 24. This second cellular layer 24 may be composed of polyurethane foam and bonded to the surface of the first cellular layer 22 after vulcanization of the tire and expansion of the first cellular layer 22. An alternative approach is to modify the amounts of foaming agent in the layer of butyl rubber to give, after expansion, predominantly open cells. The second cellular layer 24, as indicated by the arrows, is positioned towards the inside of the pressurized tire cavity 15.

Figure 8:
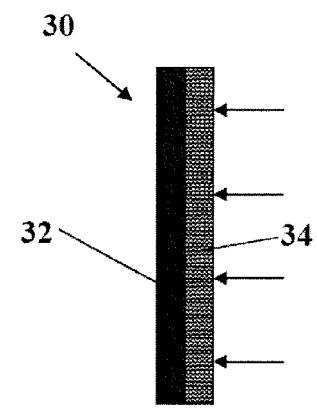

FIG. 8 presents a cellular layer 30 according to yet another embodiment of the invention. This cellular layer 30 includes a first layer of non-cellular airtight rubber 32 and a second layer of cellular rubber 34 in contact with the inflation air. Preferably, the two layers 32 and 34 are produced from a butyl rubber without a foaming agent for the first layer 32 and with a foaming agent for the second layer 34. An advantage of this approach is that it provides an excellent gas tightness for the cellular layer 30.

The thicknesses of the cellular layers 10, 20, and 30 preferably are between 1 and 4 mm, depending on the applications.

The density of the foam may range from 0.04 g/cm$^3$ to 0.8 g/cm$^3$. To optimize the absorption quality and the mass of a mounted assembly that includes the tire 1, the density preferably is between 0.06 and 0.3 g/cm$^3$.

The tire illustrated in FIGS. 2, 3, 5, and 6 includes a cellular layer made of butyl rubber and no airtight layer continuously attached to the tire structure. This tire is easily produced by applying, to a standard manufacturing drum, a first layer of butyl rubber that includes a foaming agent; then applying two strips of butyl rubber without a foaming agent at the edges of the first layer; applying, as is customary, all the other constituents of the tire; then vulcanizing the tire. After vulcanization, the gas particles released by the heat of the vulcanization process lead to an expansion of the first layer to form the cellular layer, such that its axial and longitudinal dimensions correspond to that which is required to obtain a satisfactory absorption of the rolling noise. The cellular layer then has a thickness and a density that are suitable for thus ensuring a sufficient tightness with respect to gases. As used herein, the term "cellular layer" may refer to a pre-expansion layer of cellular material or a post-expansion layer of cellular material.

When the tire includes an additional airtight layer formed of a material that includes butyl rubber, for example, it is advisable to add an anti-tack agent in order to guarantee the effective debonding of the cellular layer from the opposite wall (i.e., inner wall) of the tire structure during the expansion of the cellular layer.

The invention is not limited to the examples described and represented herein, and various modifications may be made thereto without departing from its scope defined by the appended claims.

What is claimed is:

1. A tire comprising:
a tire structure formed of at least one crown extended by two sidewalls and two beads, wherein a base of each of the two beads is adapted for mounting onto a rim seat;
a carcass-type reinforcing structure anchored into the two beads; and
a cellular layer composed of a cellular material positioned on an inner wall of the tire structure,
wherein a surface of the cellular layer is bonded to the tire structure over at most 20% of the surface and the cellular layer is not bonded to the tire structure elsewhere, and wherein an axial curved length of the cellular layer ($L_{ca}$) in an axial cross section is greater than an curved length of the inner wall of the tire structure ($L_{pa}$) in contact with the cellular layer in a same axial cross section,
wherein, when the tire is inflated for operation, the cellular layer is pressed against the inner wall of the tire structure, such that the cellular layer touches substantially an entirety of the inner wall of the tire structure at the axial cross section, and such that an excess in the axial curved length of the cellular layer ($L_{ca}$) relative to the axial curved length of the inner wall of the tire structure ($L_{pa}$) results in folds that are pressed towards the inner wall of the tire structure, and
wherein the cellular layer includes a first non-cellular layer and a second layer made of a predominantly closed-cell cellular material positioned on an innermost side of a tire cavity.

2. A tire comprising:
a tire structure formed of at least one crown extended by two sidewalls and two beads, wherein a base of each of the two beads is adapted for mounting onto a rim seat;
a carcass-type reinforcing structure anchored into the two beads; and
a cellular layer composed of a cellular material positioned on an inner wall of the tire structure,
wherein a surface of the cellular layer is bonded to the tire structure over at most 20% of the surface and the cellular layer is not bonded to the tire structure elsewhere, and wherein an axial curved length of the cellular layer ($L_{ca}$) in an axial cross section is greater than an curved length of the inner wall of the tire structure ($L_{pa}$) in contact with the cellular layer in a same axial cross section,
wherein, when the tire is inflated for operation, the cellular layer is pressed against the inner wall of the tire structure, such that the cellular layer touches substantially an entirety of the inner wall of the tire structure at the axial cross section, and such that an excess in the axial curved length of the cellular layer ($L_{ca}$) relative to the axial curved length of the inner wall of the tire structure ($L_{pa}$) results in folds that are pressed towards the inner wall of the tire structure, and
wherein the cellular layer includes a first layer made of a predominantly closed-cell cellular material and a second layer made of an open-cell cellular material.

3. A tire according to claim 1 or claim 2, wherein the cellular layer is bonded to the tire structure at edges of the cellular layer.

4. A tire according to claim 1 or claim 2, wherein the cellular layer is attached to the tire structure at the two beads.

5. A tire according to claim 1 or claim 2, wherein:

$$1.1 < \frac{L_{ca}}{L_{pa}} < 2.5.$$

6. A tire according to claim 1 or claim 2, wherein a longitudinal curved length of the cellular layer ($L_{cl}$) in a longitudinal cross section is greater than a longitudinal curved length of the inner wall of the tire structure ($L_{pl}$) in contact with the cellular layer in a same longitudinal cross section.

7. A tire according to claim 6, wherein:

$$1.1 < \frac{L_{cl}}{L_{pl}} < 2.5.$$

8. A tire according to claim 1 or claim 2, wherein the cellular layer includes butyl rubber.

9. A tire according to claim 8, wherein the cellular layer is attached to the tire structure via an additional layer of butyl rubber.

10. A tire according to claim 1 or claim 2, wherein the cellular layer is a predominantly closed-cell cellular layer.

11. A tire according to claim 1 or claim 2, further comprising an airtight layer made of a non-cellular material, the airtight layer being continuously attached to the tire structure and positioned between the cellular layer and the tire structure.

12. A tire according to claim 1 or claim 2, wherein a thickness of the cellular layer is between 0.5 and 10 mm.

13. A tire according to claim 12, wherein the thickness of the cellular layer is between 1 and 4 mm.

14. A tire according to claim 1 or claim 2, wherein a density of the cellular layer is between 0.04 and 0.8 g/cm³.

15. A tire according to claim 14, wherein the density of the cellular layer is between 0.06 and 0.3 g/cm³.

* * * * *